Oct. 28, 1969 R. D. HULL 3,474,984
LINE GUIDE FOR CLOSED FACE SPINNING REEL
Original Filed June 15, 1966
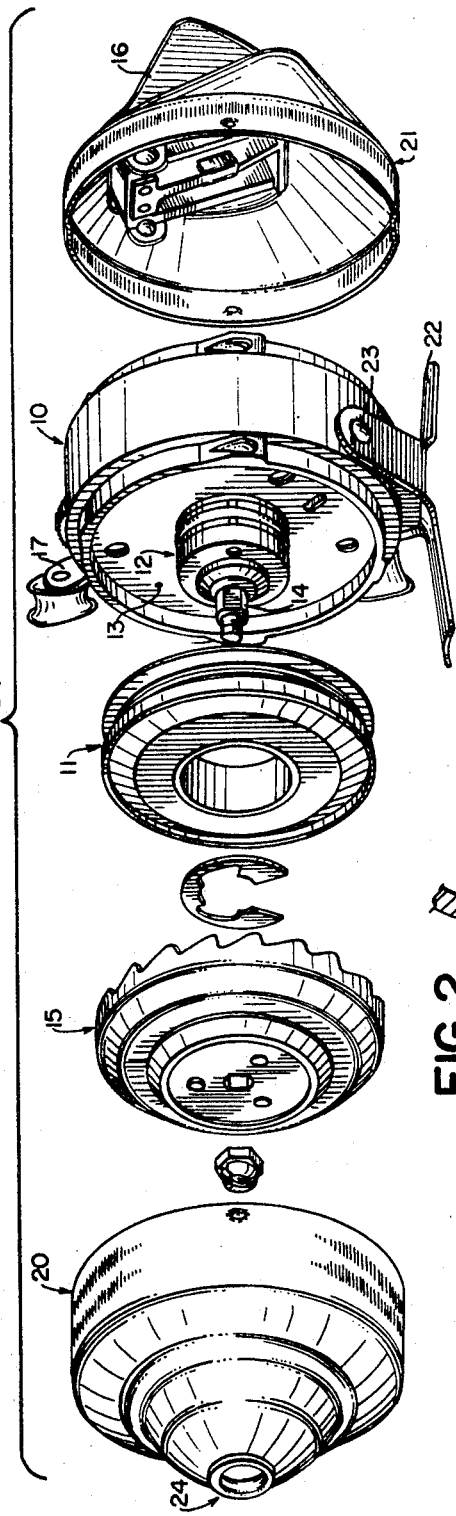
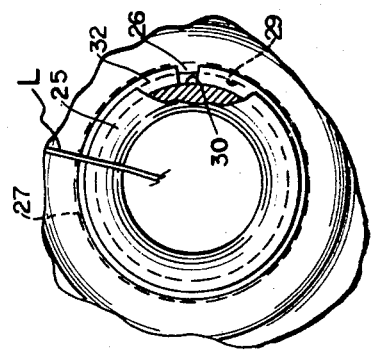
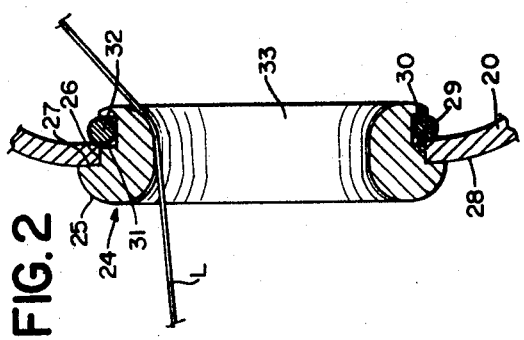
INVENTOR
R. DELL HULL
BY Mandeville & Schweitzer
ATTORNEYS United States Patent Office 3,474,984
Patented Oct. 28, 1969

3,474,984
LINE GUIDE FOR CLOSED FACE SPINNING REEL
R. Dell Hull, 6101 E. Apache St., Tulsa, Okla. 74115
Original application June 15, 1966, Ser. No. 557,752.
Divided and this application Dec. 1, 1967, Ser.
No. 687,200
Int. Cl. A01k 89/04
U.S. Cl. 242—84.2                                       4 Claims

ABSTRACT OF THE DISCLOSURE

A line guide which may be quickly assembled with a spinning reel cover by insertion through an opening in the cover and which may be held securely in place by a locking ring. The line guide is a hardened annular element which includes a rear annular shoulder equal in diameter to the cover opening. An annular groove in the shoulder supports a locking ring having an outer diameter greater than that of the cover opening.

RELATED APPLICATION

This application is a division of my copending application Ser. No. 557,752, filed June 15, 1966.

BACKGROUND OF INVENTION

In a "closed face" type spinning reel, a line spool is normally non-rotatably mounted on a hub which projects forwardly from a reel frame and is enclosed by a removable cup shaped cover. While the line spool is normally non-rotatable, provision is made for limited rotary slippage or "drag" of the spool relative to the reel frame for controlled withdrawal of line from the spool. The line itself is conducted to and from the spool through a centrally disposed line guide in the cover.

Retrieval of paid out fishing line may be effected in reels of this type by a spinner head mounted on a rotatable main shaft. Advantageously, the spinner head may include a plurality of rearwardly opening pickup slots formed thereon and may be selectively axially displaced and held in a forward, non-line engaging position during casting and in a rearward, line engaging position during line retrieval. A crank assembly is included in the reel to effect the necessary rotation of the main shaft and to retrieve paid out line. Furthermore, reels of this type generally include a selectively actuatable anti-reverse mechanism to prohibit rotation of the retrieval mechanism in a "reverse" line pay out direction.

SUMMARY OF INVENTION

An important aspect of the present invention is the provision of a new and improved line guide in the front cover. The new line guide includes a hardened annular member which has rearwardly facing portions removed therefrom to form a shoulder having an outer diameter equal to the diameter of an opening in the front of the cover. The shoulder itself has an annular groove formed thereon towards its rear surface, which groove is adapted to receive a springlike locking ring, the outer diameter of which is greater than the diameter of the opening in the front cover. Thus, in accordance with the invention, the line guide may be simply and expeditiously assembled with the front cover by first inserting the shoulder portions through the cover opening with the shoulder bearing against the outer surface of the cover and thereafter inserting the locking ring in the annular groove, causing the line guide to be securely clamped to the cover between the shoulder and the locking ring.

DESCRIPTION OF DRAWINGS

For a more complete understanding of the invention and its attendant advantages, reference should be made to the following detailed description taken in conjunction with the accompanying drawings, in which:

FIG. 1 is an exploded perspective view of a new and improved fishing reel embodying the inventive concepts;

FIG. 2 is an enlarged, cross-sectional view of the new line guide of the invention; and FIG. 3 is a rear elevational view of the new line guide.

Referring to FIG. 1, the new and improved fishing reel includes a generally cylindrical reel frame body 10 which mounts a line spool 11 on a hub 12 projceting from its front wall 13. A main shaft 14 is supported in the reel frame body for rotation and limited axial displacement. As shown best in FIG. 1, a notched spinner head 15 is mounted at the forward end of the main shaft, while a thumb button 16 engages its rearward end. The reel also includes a crank 17 which drives the main shaft 14 through a gear train disposed at the rear wall of the reel frame body. The reel frame body and the elements supported thereby are generally enclosed by front and rear covers 20 and 21, respectively. As shown a rod mount 22 is affixed to the reel frame body through rivets 23.

The above described elements are, in general, common to many spinning reels of this general type. However, it should be understood that the present invention is directed specifically to improvements in the line guide structures of such reels.

Referring now to FIGS. 1-3, a new line guide 24 is provided at the forwardmost end of the front cover 20. The line guide 24 is fabricated in the form of an annular ring 25, advantageously made of a specially hardened stainless steel, while the cover 20 typically is formed of a soft, formable material. The ring is undercut at its rearwardly facing portions to define a stepped surface having a cylindrical cover engaging portion 26 and a rearwardly facing shoulder portion 27, which are adapted to be received in a front opening 29 of the front cover 20 and to seat against the front surface 28 of the cover. An annular groove 30 is formed beneath the surface 26 and, as shown in FIG. 3, includes a forward wall 31 which is spaced from the shoulder 27 by a distance which is less than the thickness of the front cover 20.

In accordance with the invention, the line guide may easily be inserted and held in the front cover by snapping into the groove 30 a flexible, line guide retainer ring 32, which is in the form of a split wire spring, as shown in FIG. 3. The ring 32 has an inner diameter approximately equal to that of the inner diameter of the groove 30 (which is less than the diameter of the opening in the front cover 20) and has an outer diameter greater than the opening in the front cover 20. Thus the line guide may be assembled with the front cover in an extremely expedient manner by inserting the rearward facing stepped surface through the opening in the cover and thereafter snapping the retaining ring 32 into place in the groove 30.

As shown in FIG. 3, the line guide will be clampingly engaged with and secured to the front cover by the opposing shoulder 27 and the surfaces of the retaining ring 32. Tightness of the assembly is achieved by the wedging action of the retaining ring between the rearwardly facing surface of the front cover and the forwardly facing surface of the annular groove 30. Abrasion free passage of the line L through the line guide is facilitated by generous rounding of its hardened inner surfaces 33.

It will be appreciated that the new line guide assembly enables a specially hardened line guide to be installed economically and efficiently in the front cover of a fishing reel and also accommodates the simple replacement of a worn guide. Furthermore, it should be understood that the specific line guide structure herein illustrated and described is intended to be representative only, as certain changes may be made therein without departing from the clear teachings of the disclosure. Accordingly, reference should be made to the following appended claims in determining the full scope of the invention.

I claim:
1. In a housing for a closed face spinning reel having a forwardmost vertical wall including a circular opening through which fishing line may be passed, an improved line guide comprising
 (a) an annular ring formed of hardened material and having an inner diameter less than that of said circular opening and an outer diameter greater than that of said circular opening;
 (b) said annular ring having peripheral portions undercut to define an abutment shoulder and an annular surface having a diameter approximately equal to that of said circular opening;
 (c) said surface having a width substantially greater than the thickness of said front wall;
 (d) said surface having an annular groove therein; and
 (e) a retaining element disposed in said groove and having an outer diameter greater than the diameter of said circular opening;
 (f) said shoulder and said retaining element being adapted to clamp portions of said front wall therebetween.
2. The line guide of claim 1, in which
 (a) said retaining element is a ring formed of resilient material.
3. The line guide of claim 2, in which
 (a) an innermost wall of said groove is spaced from said shoulder a predetermined distance less than the thickness of said front wall.
4. The line guide of claim 2, in which
 (a) said retaining ring is a split, circular spring.

References Cited

UNITED STATES PATENTS

| | | | |
|---|---|---|---|
| 2,164,803 | 7/1939 | Duraffourg | 242—157 |
| 2,399,132 | 4/1946 | Maynes | 242—157 XR |
| 3,298,628 | 1/1967 | Harrington et al. | 242—84.2 |

BILLY S. TAYLOR, Primary Examiner

U.S. Cl. X.R.

242—157